(12) United States Patent
Zhang et al.

(10) Patent No.: US 12,000,497 B2
(45) Date of Patent: Jun. 4, 2024

(54) GM TYPE CRYOGENIC REFRIGERATOR ROTARY VALVE

(71) Applicant: Institute of New Materials, Guangdong Academy of Sciences, Guangdong (CN)

(72) Inventors: Jifu Zhang, Guangdong (CN); Xingchi Chen, Guangdong (CN); Min Liu, Guangdong (CN); Mingjiang Dai, Guangdong (CN); Chunming Deng, Guangdong (CN); Changguang Deng, Guangdong (CN)

(73) Assignee: Institute of New Materials, Guangdong Academy of Sciences, Guangzhou (CN)

( * ) Notice: Subject to any disclaimer, the term of this patent is extended or adjusted under 35 U.S.C. 154(b) by 743 days.

(21) Appl. No.: 17/253,112

(22) PCT Filed: Dec. 6, 2018

(86) PCT No.: PCT/CN2018/119584
§ 371 (c)(1),
(2) Date: Dec. 16, 2020

(87) PCT Pub. No.: WO2020/006981
PCT Pub. Date: Jan. 9, 2020

(65) Prior Publication Data
US 2021/0270380 A1    Sep. 2, 2021

(30) Foreign Application Priority Data
Jul. 2, 2018  (CN) .......................... 201810712877.1

(51) Int. Cl.
*F16K 27/00*    (2006.01)
*C25D 11/02*    (2006.01)
(Continued)

(52) U.S. Cl.
CPC .............. *F16K 3/08* (2013.01); *C25D 11/026* (2013.01); *C25D 11/06* (2013.01); *F16K 3/085* (2013.01);
(Continued)

(58) Field of Classification Search
CPC . F16K 3/08; F16K 3/085; F16K 27/00; F25B 41/20; F25B 9/14; Y10T 137/86823; C25D 11/026; C25D 11/06
(Continued)

(56) References Cited

U.S. PATENT DOCUMENTS 3,205,668 A * 9/1965 Gifford .................... F25B 9/14
62/6
4,430,863 A * 2/1984 Longsworth ............. F25B 9/14
137/625.21
(Continued)

FOREIGN PATENT DOCUMENTS

CN    101012980 A    8/2007
CN    201359106 Y    12/2009

*Primary Examiner* — William M McCalister

(57) ABSTRACT

Disclosed are a GM type cryogenic refrigerator rotary valve and a preparation method therefor. The GM type cryogenic refrigerator rotary valve comprises an aluminum alloy rotating valve and an alumina ceramic membrane. A valve body of the aluminum alloy rotating valve is provided with a first surface for arranging a working boss and a second surface opposite to the first surface; and a high-pressure hole and a low-pressure groove are both provided in the working boss, and a vent hole is provided in the first surface; the high-pressure hole and the vent hole both penetrate the valve body, and an air chamber is formed on the second surface. The alumina ceramic membrane is plated on surface of the aluminum alloy rotating valve. The preparation method comprises: plating an alumina ceramic membrane on surface of an aluminum alloy rotating valve by means of a micro-arc oxidation process.

11 Claims, 2 Drawing Sheets

(51) Int. Cl.
*C25D 11/06* (2006.01)
*F16K 3/08* (2006.01)
*F25B 9/14* (2006.01)
*F25B 41/20* (2021.01)

(52) U.S. Cl.
CPC .............. *F16K 27/00* (2013.01); *F25B 41/20* (2021.01); *F25B 9/14* (2013.01); *Y10T 137/86823* (2015.04)

(58) Field of Classification Search
USPC .................................................... 137/625.41
See application file for complete search history.

(56) References Cited

U.S. PATENT DOCUMENTS

| | | | |
|---|---|---|---|
| 5,878,580 A * | 3/1999 | Schilling | F25B 9/14 62/467 |
| 7,654,096 B2 * | 2/2010 | Xu | F25B 9/14 137/625.46 |
| 8,899,053 B2 * | 12/2014 | Matsubara | F25B 9/14 62/6 |
| 9,366,459 B2 * | 6/2016 | Morie | F25B 9/14 |
| 10,018,380 B2 * | 7/2018 | Morie | F25B 9/14 |
| 10,184,694 B2 * | 1/2019 | Morie | F25B 9/10 |
| 2002/0066276 A1 * | 6/2002 | Kawano | F16K 31/041 251/129.11 |
| 2004/0040315 A1 * | 3/2004 | Koyama | F16K 11/0856 62/6 |
| 2009/0151803 A1 * | 6/2009 | Longsworth | F25B 9/145 137/630.21 |
| 2011/0061404 A1 * | 3/2011 | Ishizuka | F25B 9/14 62/6 |
| 2013/0025297 A1 * | 1/2013 | Matsubara | F16K 25/005 251/304 |
| 2013/0031916 A1 * | 2/2013 | Matsubara | F25B 9/14 62/6 |
| 2015/0107681 A1 * | 4/2015 | Killeen | F16K 11/08 137/12 |
| 2016/0061493 A1 * | 3/2016 | Morie | F25B 9/14 62/3.1 |
| 2017/0184328 A1 * | 6/2017 | Morie | F16K 11/074 |

\* cited by examiner

20

GM TYPE CRYOGENIC REFRIGERATOR ROTARY VALVE

CROSS-REFERENCE TO RELATED APPLICATION

This application is based on and claims priority benefits from China Patent Application No. 201810712877.1, entitled "GM type cryogenic refrigerator rotary valve", filed on Jul. 2, 2018, the entire contents of which are expressly incorporated hereinto by reference.

TECHNICAL FIELD

The present invention relates to the field of material processing, and in particular to a GM type cryogenic refrigerator rotary valve and a preparation method therefor.

BACKGROUND

A rotary valve, which is a core component of a GM type cryogenic refrigerator, is used to control the timing of intake and exhaust of the refrigerator. A rotor and a stator in the rotary valve are usually in close mechanical contact, and there will be greater friction on the contact surface, causing serious wear of the valve core. On the other hand, a large torque is required to rotate the valve core, which causes increased load of the motor. When the refrigerator runs for a long time, the problem of valve core wear becomes more prominent, which will directly affect the performance and even the service life of the refrigerator.

At present, most of the friction pairs of refrigerators are metal-metal, metal-plastic, and the like. After a period of use, inevitable friction will cause increased clearance, and increased air leakage and blow-by, reducing refrigeration efficiency and life. Therefore, use of new materials to improve the service life of the refrigerator is of great significance.

A traditional rotary valve core is made of a material of Rulon (polytetrafluoroethylene), which has a self-lubricating effect. Such a rotary valve has a simple structure, and has high requirements of precision. In the working process of the refrigerator, the steel valve seat and the PTFE valve core are always in a rotational friction state. In order to ensure accurate air distribution angle, a vent hole on the valve body is not chamfered, and it is relatively sharp. The air distribution cavity of the valve core will be worn after long-term operation. The actual machining error renders that the air distribution valve is unevenly stressed and the wear is aggravated. The worn air distribution cavity cannot be compensated, so that blow-by is aggravated, operating reliability of the rotary valve is poor, and the service life is short, which will directly affect operating reliability of the refrigerator.

Advanced ceramic materials have been applied in many fields due to their high specific strength and specific stiffness, and good dimensional stability and wear resistance. However, due to the nature of the chemical bonds of ceramic materials, there is no other mechanism to absorb work of fracture when a crack propagates in the materials. Only surface energy of a new surface formed by fracture consumes the crack propagation energy so that the toughness of ceramics is very low. In addition, manufacture of valve cores from ceramic materials is difficult to process, the dimensional accuracy is difficult to ensure, and the cost is high, which limits its application.

SUMMARY

An objective of the present invention is to provide a GM type cryogenic refrigerator rotary valve which has at least advantages of small starting torque, high working surface hardness, good wear resistance, good sealing performance, long service life, etc.

A further objective of the present invention is to provide a preparation method of the aforementioned GM type cryogenic refrigerator rotary valve. The method is simple and easy to operate, and at least can effectively avoid inclusion particles in gas to damage the valve body surface, which results in a better sealing effect.

The technical problem of the present invention is solved by the following technical solutions:

A GM type cryogenic refrigerator rotary valve provided in the present invention comprises an aluminum alloy rotating valve and an alumina ceramic membrane.

The aluminum alloy rotating valve comprises a valve body, a high-pressure hole, a working boss, a low-pressure groove, a vent hole and an air chamber.

The valve body has a first surface for arranging the working boss and a second surface opposite to the first surface; the high-pressure hole and the low-pressure groove are both arranged in the working boss, the high-pressure hole penetrates the valve body along a direction from the first surface to the second surface, the vent hole is provided in the first surface and penetrates the valve body along the direction from the first surface to the second surface; and the air chamber is provided on the second surface.

The alumina ceramic membrane is plated on surface of the aluminum alloy rotating valve.

Optionally, a height of the working boss protruding from the first surface is in a range from 0.4 mm to 0.6 mm.

Optionally, the alumina ceramic membrane has a thickness in a range from 60 μm to 80 μm.

Optionally, a dense layer in the alumina ceramic membrane has a thickness greater than or equal to 50 μm.

Optionally, the GM type cryogenic refrigerator rotary valve has a surface roughness Ra≤0.1 μm for the working boss, and a surface roughness Ra≤3 μm for the remaining surfaces.

Optionally, the high-pressure hole has a cross-section in a half-moon shape.

Optionally, the valve body includes a first cylindrical structure and a second cylindrical structure which are arranged coaxially with and connected to each other; the first cylindrical structure has a larger diameter than the second cylindrical structure; an end surface of the first cylindrical structure away from the second cylindrical structure forms the first surface, and an end surface of the second cylindrical structure away from the first cylindrical structure forms the second surface.

Optionally, the working boss has a cylindrical outer contour, and the working boss has a smaller diameter than the first cylindrical structure and the second cylindrical structure.

Optionally, the low-pressure groove has an elongated cross section, and both ends of the low-pressure groove are arcuate.

Optionally, the low-pressure groove is provided in the middle of the working boss, and the high-pressure hole is provided in an edge of the working boss.

Optionally, the vent hole is a circular hole, and the vent hole and the high-pressure hole are spaced apart.

Optionally, the air chamber is a circular groove, and an opening of the air chamber is in a flared structure with the opening inclined outwardly.

A preparation method of a GM type cryogenic refrigerator rotary valve aforementioned, which is also provided in the present invention, comprises a following step: plating an alumina ceramic membrane on surface of an aluminum alloy rotating valve by means of a micro-arc oxidation process, and the micro-arc oxidation process comprising: applying a 400-550V forward voltage with a duty cycle of 20-50% and a 50-200V negative voltage with a duty cycle of 30-80% to the aluminum alloy rotating valve, as a treatment anode, placed in an electrolyte solution, and performing treatment for 60 to 90 min under conditions of frequency of 100 to 1000 Hz and a temperature of the electrolyte solution of 25 to 60° C.

Optionally, the electrolyte solution contains 10 to 40 g/L sodium silicate, 5 to 15 g/L sodium tetraborate, and 2 to 10 g/L sodium hydroxide.

Optionally, the electrolyte solution further contains 2 to 10 g/L sodium tungstate and 15 to 30 g/L sodium metaaluminate.

Optionally, the electrolyte solution further contains 5 to 30 g/L disodium EDTA and 5 to 30 g/L sodium citrate.

Optionally, the preparation method further comprises a first polishing treatment after the alumina oxide ceramic membrane is plated on the surface of the aluminum alloy rotary valve, and the first polishing treatment is carried out for 1 to 2 hours at a polishing speed of 1500 to 2000 rpm to remove a loose oxide layer on the surface of the working surface.

Optionally, the preparation method further comprises a second polishing treatment after the first polishing treatment, and the second polishing treatment is carried out for 0.5 to 1 hour at a polishing speed of 1500 to 2000 rpm so that the working boss has surface roughness Ra≤0.05 μm.

The beneficial effects of the GM type cryogenic refrigerator rotary valve and the preparation method thereof provided by a preferred embodiment of the present invention at least include:

The GM type cryogenic refrigerator rotary valve provided by the preferred embodiment of the present invention is made of a light-weight aluminum alloy material with a lower density, which has a small starting torque and a small motor load.

Surface ceramicization is performed on the aluminum alloy valve body by means of the micro-arc oxidation process, so that the GM type cryogenic refrigerator rotary valve has advantages of high hardness, good wear resistance, and long service life.

The sealing effect is good due to precision machining; and the surface ceramicization can effectively prevent surface of the GM type cryogenic refrigerator rotary valve from being damaged by inclusion particles in gas, preventing the sealing effect lowering.

BRIEF DESCRIPTION OF DRAWINGS

In order to more clearly illustrate the technical solutions in the embodiments of the present invention or the prior art, the drawings to be required in embodiments or the prior art are briefly described below.

Figure 1:
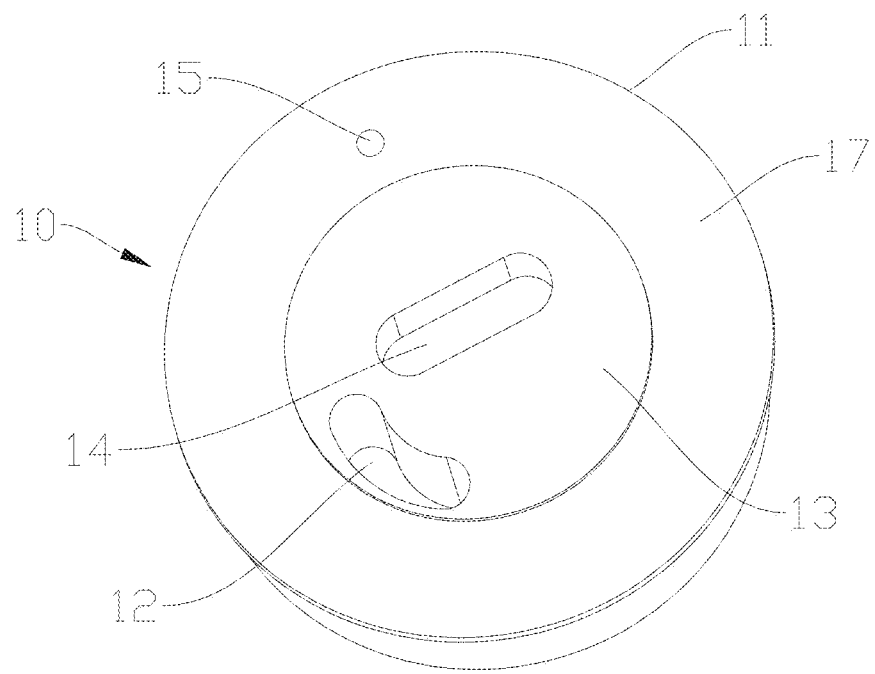
FIG. 1 is a schematic diagram of the structure of the GM type cryogenic refrigerator rotary valve according to Example 1 in the first view.

Reference signs: 20: GM type cryogenic refrigerator rotary valve; 10: aluminum alloy rotating valve; 11: valve body; 12: high-pressure hole; 13: working boss; 14: low-pressure groove; 15: vent hole; 16: air chamber; 17: first surface; and 18: second surface.

DETAILED DESCRIPTION

Hereafter, technical solutions in embodiments of the present invention will be described clearly and completely in conjunction with the drawings in the embodiments of the present invention, in order to make the purposes, the technical solutions, and advantages of the embodiments of the present invention clearer. Obviously, the described embodiments are part of the embodiments of the present invention, rather than all of the embodiments. The components of the embodiments of the present invention generally described and shown in the drawings herein may be arranged and designed in various different configurations.

Hereafter, technical solutions in embodiments of the present invention will be described clearly and completely in order to make the purposes, the technical solutions, and advantages of the embodiments of the present invention clearer. Where no specific conditions are specified in the examples, the conditions are in accordance with conventional conditions or those recommended by manufacturers. Where the manufacturers are not specified, the reagents or instruments used are conventional products that can be purchased commercially.

Hereafter, the GM type cryogenic chiller rotary valve and its preparation method according to the embodiments of the present invention will be specifically described.

The GM type cryogenic refrigerator rotary valve according to the embodiments of the present invention comprises an aluminum alloy rotating valve 10 and an alumina ceramic membrane. The aluminum alloy rotating valve 10 comprises a valve body 11, a high-pressure hole 12, a working boss 13, a low-pressure groove 14, a vent hole 15 and an air chamber 16. The aluminum alloy rotating valve 10, which is made of a light-weight aluminum alloy material with a lower density, has advantages of small starting torque and small motor load.

The valve body 11 has a first surface 17 for arranging the working boss 13 and a second surface 18 opposite to the first surface 17. Preferably, the distance between the first surface 17 and the second surface 18 may be in a range from 14 mm to 16 mm, and a height of the working boss 13 protruding from the first surface 17 is in a range from 0.4 mm to 0.6 mm, e.g., 0.4 mm, 0.5 mm, and 0.6 mm.

The valve body 11 includes a first cylindrical structure and a second cylindrical structure which are arranged coaxially with and connected to each other. The first cylindrical structure has a larger diameter than the second cylindrical structure. An end surface of the first cylindrical structure away from the second cylindrical structure forms the first surface 17, and an end surface of the second cylindrical structure away from the first cylindrical structure forms the second surface 18.

The working boss 13 has a cylindrical outer contour, and the working boss 13 has a smaller diameter than the first cylindrical structure and the second cylindrical structure.

The high-pressure hole 12 and the low-pressure groove 14 are both arranged in the working boss 13, and the high-pressure hole 12 penetrates the valve body 11 along a direction from the first surface 17 to the second surface 18. The high-pressure hole 12 is mainly used to connect a high-pressure gas source when the GM type cryogenic refrigerator rotary valve is opened, and the low-pressure groove 14 is mainly used to connect the low-pressure gas source when the GM type cryogenic refrigerator rotary valve is opened. Alternatively, in the present invention, the high-pressure hole 12 may be have a cross-section, for example, in a half-moon shape.

The low-pressure groove 14 may have an elongated cross section, and both ends of the low-pressure groove 14 are arcuate. The low-pressure groove 14 is provided in the middle of the working boss 13, and the high-pressure hole 12 is provided in an edge of the working boss 13.

The vent hole 15 is provided in the first surface 17 and penetrates the valve body 11 along the direction from the first surface 17 to the second surface 18. Preferably, the diameter of the vent hole 15 may be in a range from 2.8 mm to 3.2 mm. The air chamber 16 is opened on the second surface, and the diameter of the vent hole 15 may be in a range from 8 mm to 8.5 mm.

The vent hole 15 is a circular hole, and the vent hole 15 and the high-pressure hole 12 are spaced apart.

The air chamber 16 is a circular groove, and an opening of the air chamber 16 is in a flared structure with the opening inclined outwardly. The high-pressure hole 12, the vent hole 15 and the air chamber 16 are spaced apart, and the high-pressure hole 12 and the air chamber 16 are arranged opposite each other. The alumina ceramic membrane is plated on the surface of the aluminum alloy rotating valve. Preferably, the thickness of the alumina ceramic membrane may be in a range from 60 to 80 μm, and the thickness of a dense layer in the alumina ceramic membrane is preferably greater than or equal to 50 μm. The alumina ceramic membrane within the abovementioned thickness range is plated on the surface of the aluminum alloy rotating valve, which, on the one hand, can effectively prevent the surface of the valve body from being damaged by inclusion particles in gas and improve the sealing effect; on the one hand, can improve the hardness and wear resistance of the GM type cryogenic chiller rotary valve and extend its service life.

In an embodiment, the surface roughness of the working boss of the GM type cryogenic refrigerator rotary valve can be controlled to Ra≤0.11 μm, and the roughness of the remaining surfaces can be controlled to Ra≤31 μm, in order to improve the precision of the GM type cryogenic refrigerator rotary valve.

A preparation method of the abovementioned GM type cryogenic refrigerator rotary valve according to embodiments of the present invention, which is simple, easy to operate, can effectively prevent the surface of the valve body from being damaged by inclusion particles in gas and improve the sealing effect, may include, for example, the following step: plating an alumina ceramic membrane on surface of an aluminum alloy rotating valve by means of a micro-arc oxidation process.

The micro-arc oxidation process may comprises: applying a 400-550V forward voltage with a duty cycle of 20-50% and a 50-200V negative voltage with a duty cycle of 30-80% to the aluminum alloy rotating valve, as a treatment anode, placed in an electrolyte solution, and performing treatment for 60 to 90 min under conditions of frequency of 100 to 1000 Hz and an electrolyte temperature of 25 to 60° C.

The duty cycle of the forward voltage can be 20%, 25%, 30%, 35%, 40%, 45%, 50%, or other any suitable value, and the forward voltage can have be 400V, 420V, 440V, 460V, 480V, 500V, 520V, 540V, 550V, or other any suitable value. The duty cycle of the negative voltage can be 30%, 35%, 40%, 45%, 50%, 55%, 60%, 65%, 70%, 75%, 80%, or other any suitable value, and the negative voltage can be 50V, 70V, 90V, 110V, 130V, 150V, 170V, 190V, 200V, or other any suitable value. The frequency can be 100 Hz, 200 Hz, 300 Hz, 400 Hz, 500 Hz, 600 Hz, 700 Hz, 800 Hz, 900 Hz, 1,000 Hz, or other any suitable value. The electrolyte temperature can be 25° C., 30° C., 35° C., 40° C., 45° C., 50° C., 55° C., 60° C., or other any suitable value. The treatment time can be 60 min, 65 min, 70 min, 75 min, 80 min, 85 min, 90 min, or other any suitable value.

The electrolyte solution may contain, for example, 10 to 40 g/L sodium silicate, 5 to 15 g/L sodium tetraborate, and 2 to 10 g/L sodium hydroxide. These three substances constitute the main membrane-forming salts in the electrolyte solution. It is worth noting that the abovementioned concentrations are concentrations in the electrolyte solution. For example, 10 to 40 g/L sodium silicate means that sodium silicate is present in the electrolyte solution in a concentration of 10 to 40 g/L.

The concentration of sodium silicate can be 10 g/L, 15 g/L, 20 g/L, 25 g/L, 30 g/L, 35 g/L, 40 g/L, or other any suitable value. The concentration of sodium tetraborate can be 5 g/L, 7 g/L, 9 g/L, 11 g/L, 13 g/L, 15 g/L, or other any suitable value. The concentration of sodium hydroxide can be 2 g/L, 4 g/L, 6 g/L, 8 g/L, 10 g/L, or other any suitable value.

Preferably, the electrolyte solution may further contain sodium tungstate and sodium metaaluminate, and their concentrations in the electrolyte solution may be 2 to 10 g/L and 15 to 30 g/L, respectively. Addition of sodium tungstate and sodium metaaluminate can effectively improve the microhardness and wear resistance of the alumina ceramic membrane.

The concentration of sodium tungstate may be 2 g/L, 4 g/L, 6 g/L, 8 g/L, 10 g/L, or other any suitable value. The concentration of sodium metaaluminate may be 15 g/L, 20 g/L, 25 g/L, 30 g/L, or other any suitable value.

Preferably, the electrolyte solution may further contain disodium EDTA and sodium citrate, and the concentrations of both of them in the electrolyte solution may be 5 to 30 g/L. Addition of disodium EDTA and sodium citrate can effectively improve even plating and deep plating of the inner hole membrane of a workpiece.

The concentration of disodium EDTA may be 5 g/L, 10 g/L, 15 g/L, 20 g/L, 25 g/L, 30 g/L, or other any suitable value. The concentration of sodium citrate may be 5 g/L, 10 g/L, 15 g/L, 20 g/L, 25 g/L, 30 g/L, or other any suitable value.

After the above treatment, the total thickness of the alumina ceramic membrane can reach 60 to 80 μm, and the thickness of a dense layer in the alumina ceramic membrane is not less than 50 μm.

In the above-mentioned micro-arc oxidation process, voltages are applied to the workpiece by means of a special micro-arc oxidation power source, so that the metal (Al) on the surface of the workpiece interacts with the electrolyte solution to form a micro-arc discharge on the surface of the workpiece. Under the action of high temperature, electric field and other factors, the alumina ceramic membrane is formed on the surface of the aluminum alloy rotating valve so as to strengthen the surface of the workpiece. The alumina ceramic membrane and the aluminum alloy rotating valve are firmly combined, which results in dense structure and high toughness, so that the GM type cryogenic refrigerator rotary valve has performance of good wear resistance, corrosion resistance, high temperature impact resistance and electrical insulation.

In an embodiment, the preparation method further comprises a step of degreasing and cleaning the aluminum alloy rotating valve prior to being placed in the electrolyte solution.

In an embodiment, a first polishing treatment may be performed after the alumina oxide ceramic membrane is plated on the surface of the aluminum alloy rotating valve. Preferably, the first polishing treatment may be performed for 1 to 2 hours with W40 diamond polishing paste at a polishing speed of 1,500 to 2,000 rpm to remove a loose oxide layer on the surface of the working boss.

The polishing speed of the first polishing treatment may be 1,500 rpm, 1,600 rpm, 1,700 rpm, 1,800 rpm, 1,900 rpm, 2,000 rpm, or other any suitable value. The polishing time of the first polishing treatment may be 1 hour, 1.2 hours, 1.4 hours, 1.6 hours, 1.8 hours, 2 hours, or other any suitable value.

In an embodiment, a second polishing treatment after the first polishing treatment may be included. The second polishing treatment is carried out for 0.5 to 1 hour with W10 diamond polishing paste at a polishing speed of 1500 to 2000 rpm so that the working boss has surface roughness Ra≤0.1 μm, preferably Ra≤0.05 μm.

The polishing speed of the second polishing treatment may be 1,500 rpm, 1,600 rpm, 1,700 rpm, 1,800 rpm, 1,900 rpm, 2,000 rpm, or other any suitable value. The polishing time of the second polishing treatment may be 0.5 hour, 0.6 hours, 0.7 hours, 0.8 hours, 0.9 hours, 1 hour, or other any suitable value.

The working surface of the rotary valve body of the G-M type cryogenic refrigerator after being polished has a mirror effect, and the remaining alumina ceramic membrane after polishing has a thickness of 401 μm or larger, and a hardness 1,000 HV or larger.

The features and performance of the present invention will be further described in detail below in conjunction with embodiments.

Example 1

Figure 2:
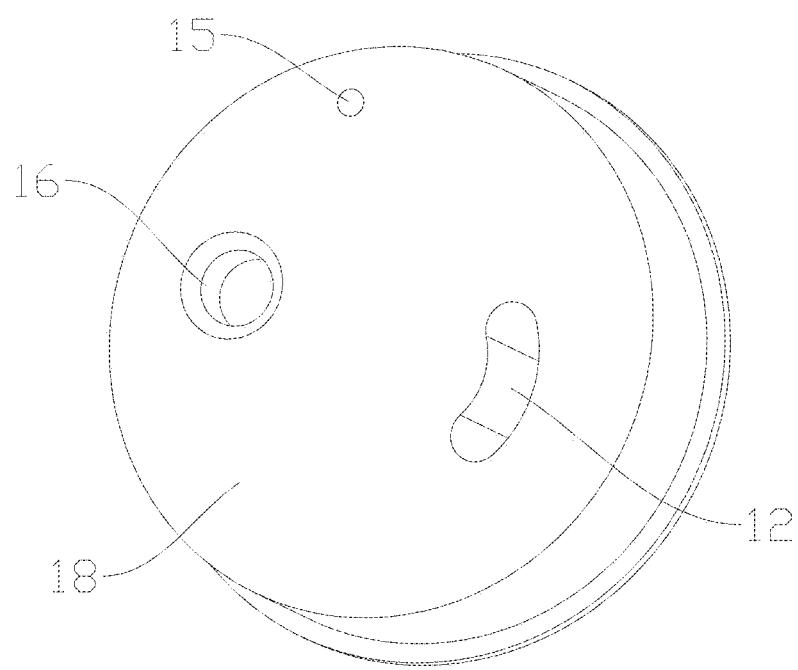
FIG. 2 is a schematic diagram of the structure of the GM type cryogenic refrigerator rotary valve according to Example 1 in the second view.

Refer to FIG. 1 and FIG. 2. A GM type cryogenic refrigerator rotary valve 20 according to the example comprises an aluminum alloy rotating valve 10 and an alumina ceramic membrane (not shown).

The aluminum alloy rotating valve 10 comprises a valve body 11, a high-pressure hole 12, a working boss 13, a low-pressure groove 14, a vent hole 15 and an air chamber 16.

The valve body 11 has a first surface 17 for arranging the working boss 13 and a second surface 18 opposite to the first surface 17. The distance between the first surface 17 and the second surface 18 is 15 mm, and a height of the working boss 13 protruding from the first surface 17 is 0.5 mm.

The high-pressure hole 12 and the low-pressure groove 14 are both arranged in the working boss 13. The high-pressure hole 12 has a cross-section in a half-moon shape, and penetrates the valve body 11 along a direction from the first surface 17 to the second surface 18. The vent hole 15 is provided in the first surface 17 and penetrates the valve body 11 along the direction from the first surface 17 to the second surface 18. The vent hole 15 has a diameter of 3 mm. The air chamber 16 is provided on the second surface 18, and has a diameter of 8.2 mm.

The alumina ceramic membrane is plated on the surface of the aluminum alloy rotating valve 10.

Example 2

(1) The aluminum alloy rotating valve according to Example 1 is made of 6061 aluminum alloy material. The surface roughness Ra of the working boss of the resultant aluminum alloy rotating valve is about 0.04 μm, and the roughness Ra of the remaining surface is about 2.5 μm.

(2) The degreased and cleaned aluminum alloy rotating valve is placed in a stainless steel tank containing electrolyte solution as a treatment anode. The treatment anode is applied with 450V positive voltage with duty cycle of 25% and 80V negative voltage with duty cycle of 45%, and treatment is performed for 90 minutes at a frequency of 600 Hz and a bath temperature of 40-50° C. The electrolyte solution used in the micro-arc oxidation process comprises: sodium silicate 25 g/L, sodium tetraborate 15 g/L, sodium hydroxide 2 g/L, sodium tungstate 2 g/L, sodium metaaluminate 30 g/L, disodium EDTA 30 g/L, and sodium citrate 30 g/L. After treatment, the thickness of the resultant alumina ceramic membrane is about 68 μm, and the thickness of the dense layer is about 50 μm.

(3) The surface of the working boss of the aluminum alloy rotating valve is polished by using a surface grinder. First, a loose oxide layer is removed from the GM type cryogenic refrigerator rotary valve by using W40 diamond polishing paste, with polishing speed of 2,000 rpm and polishing time of 1 hour; then the surface of the working boss is polished until it has mirror gloss by using W10 diamond polishing paste, with polishing speed of 1,500 rpm and polishing time of 0.5 hour.

After polishing, the working boss has a surface roughness Ra of 0.045 μm, the thickness of the alumina ceramic membrane is about 53 μm, and the average surface microhardness is 1,207 HV.

Example 3

(1) A aluminum alloy rotating valve in the example is made in the same manner described in Example 2.

(2) The degreased and cleaned aluminum alloy rotating valve is placed in a stainless steel tank containing electrolyte solution as a treatment anode. The treatment anode is applied with 550V positive voltage with duty cycle of 20% and 150V negative voltage with duty cycle of 50%, and treatment is performed for 90 minutes at a frequency of 1,000 Hz and a bath temperature of 40-50° C. The electrolyte solution used in the micro-arc oxidation process comprises: sodium silicate 40 g/L, sodium tetraborate 15 g/L, sodium hydroxide 10 g/L, sodium tungstate 10 g/L, sodium metaaluminate 30 g/L, disodium EDTA 30 g/L, and sodium citrate 30 g/L. After treatment, the thickness of the resultant alumina ceramic membrane is about 78 μm, and the thickness of the dense layer is about 50 μm.

(3) The surface of the working boss of the aluminum alloy rotating valve is polished by using a surface grinder. First, a loose oxide layer is removed from the GM type cryogenic refrigerator rotary valve by using W40 diamond polishing paste, with polishing speed of 2,000 rpm and polishing time of 1 hour; then the surface of the working boss is polished until it has mirror gloss by using W10 diamond polishing paste, with polishing speed of 1,500 rpm and polishing time of 0.5 hour.

After polishing, the working boss has a surface roughness Ra of 0.04 μm, the thickness of the alumina ceramic membrane is about 55 μm, and the average surface microhardness is 1,117 HV.

Example 4

(1) A aluminum alloy rotating valve in the example is made in the same manner described in Example 2.

(2) The degreased and cleaned aluminum alloy rotating valve is placed in a stainless steel tank containing electrolyte solution as a treatment anode. The treatment anode is applied with 450V positive voltage with duty cycle of 25% and 150V negative voltage with duty cycle of 50%, and treatment is performed for 90 minutes at a frequency of 1,000 Hz and a bath temperature of 40-50° C. The electrolyte solution used in the micro-arc oxidation process comprises: sodium silicate 15 g/L, sodium tetraborate 5 g/L, sodium hydroxide 4 g/L, sodium tungstate 5 g/L, sodium metaaluminate 15 g/L, disodium EDTA 30 g/L, and sodium citrate 30 g/L. After treatment, the thickness of the resultant alumina ceramic membrane is about 71 μm, and the thickness of the dense layer is about 50 μm.

(3) The surface of the working boss of the aluminum alloy rotating valve is polished by using a surface grinder. First, a loose oxide layer is removed from the GM type cryogenic refrigerator rotary valve by using W40 diamond polishing paste, with polishing speed of 2,000 rpm and polishing time of 1 hour; then the surface of the working boss is polished until it has mirror gloss by using W10 diamond polishing paste, with polishing speed of 1,500 rpm and polishing time of 0.5 hour.

After polishing, the working boss has a surface roughness Ra of 0.041 μm, the thickness of the alumina ceramic membrane is about 48 μm, and the average surface microhardness is 1,275 HV.

Example 5

(1) The aluminum alloy rotating valve according to Example 1 is made of 6061 aluminum alloy material. The surface roughness Ra of the working boss of the resultant aluminum alloy rotating valve is about 0.05 μm, and the roughness Ra of the remaining surface is about 2 μm.

(2) The degreased and cleaned aluminum alloy rotating valve is placed in a stainless steel tank containing electrolyte solution as a treatment anode. The treatment anode is applied with 400V positive voltage with duty cycle of 50% and 50V negative voltage with duty cycle of 30%, and treatment is performed for 60 minutes at a frequency of 600 Hz and a bath temperature of 25-40° C. The electrolyte solution used in the micro-arc oxidation process comprises: sodium silicate 10 g/L, sodium tetraborate 10 g/L, sodium hydroxide 6 g/L, sodium tungstate 6 g/L, sodium metaaluminate 20 g/L, disodium EDTA 5 g/L, and sodium citrate 5 g/L. After treatment, the thickness of the resultant alumina ceramic membrane is about 60 μm, and the thickness of the dense layer is about 55 μm.

(3) The surface of the working boss of the aluminum alloy rotating valve is polished by using a surface grinder. First, a loose oxide layer is removed from the GM type cryogenic refrigerator rotary valve by using W40 diamond polishing paste, with polishing speed of 1,500 rpm and polishing time of 2 hours; then the surface of the working boss is polished until it has mirror gloss by using W10 diamond polishing paste, with polishing speed of 2,000 rpm and polishing time of 1 hour.

After polishing, the working boss has a surface roughness Ra of 0.05 μm, the thickness of the alumina ceramic membrane is about 45 μm, and the average surface microhardness is 1,125 HV.

Example 6

(1) The aluminum alloy rotating valve according to Example 1 is made of 6061 aluminum alloy material. The surface roughness Ra of the working boss of the resultant aluminum alloy rotating valve is about 0.1 μm, and the roughness Ra of the remaining surface is about 3 μm.

(2) The degreased and cleaned aluminum alloy rotating valve is placed in a stainless steel tank containing electrolyte solution as a treatment anode. The treatment anode is applied with 400V positive voltage with duty cycle of 20% and 200V negative voltage with duty cycle of 80%, and treatment is performed for 75 minutes at a frequency of 600 Hz and a bath temperature of 45-60° C. The electrolyte solution used in the micro-arc oxidation process comprises: sodium silicate 20 g/L, sodium tetraborate 15 g/L, sodium hydroxide 2 g/L, sodium tungstate 8 g/L, sodium metaaluminate 25 g/L, disodium EDTA 20 g/L, and sodium citrate 20 g/L. After treatment, the thickness of the resultant alumina ceramic membrane is about 80 μm, and the thickness of the dense layer is about 50 μm.

(3) The surface of the working boss of the aluminum alloy rotating valve is polished by using a surface grinder. First, a loose oxide layer is removed from the GM type cryogenic refrigerator rotary valve by using W40 diamond polishing paste, with polishing speed of 1,800 rpm and polishing time of 1.5 hours; then the surface of the working boss is polished until it has mirror gloss by using W10 diamond polishing paste, with polishing speed of 1,800 rpm and polishing time of 0.8 hour.

After polishing, the working boss has a surface roughness Ra of 0.1 μm, the thickness of the alumina ceramic membrane is about 40 μm, and the average surface microhardness is 1,213 HV.

Test Example 1

The above-mentioned Examples 2-5 are repeated to obtain enough GM type cryogenic refrigerator rotary valves.

Figure 3:
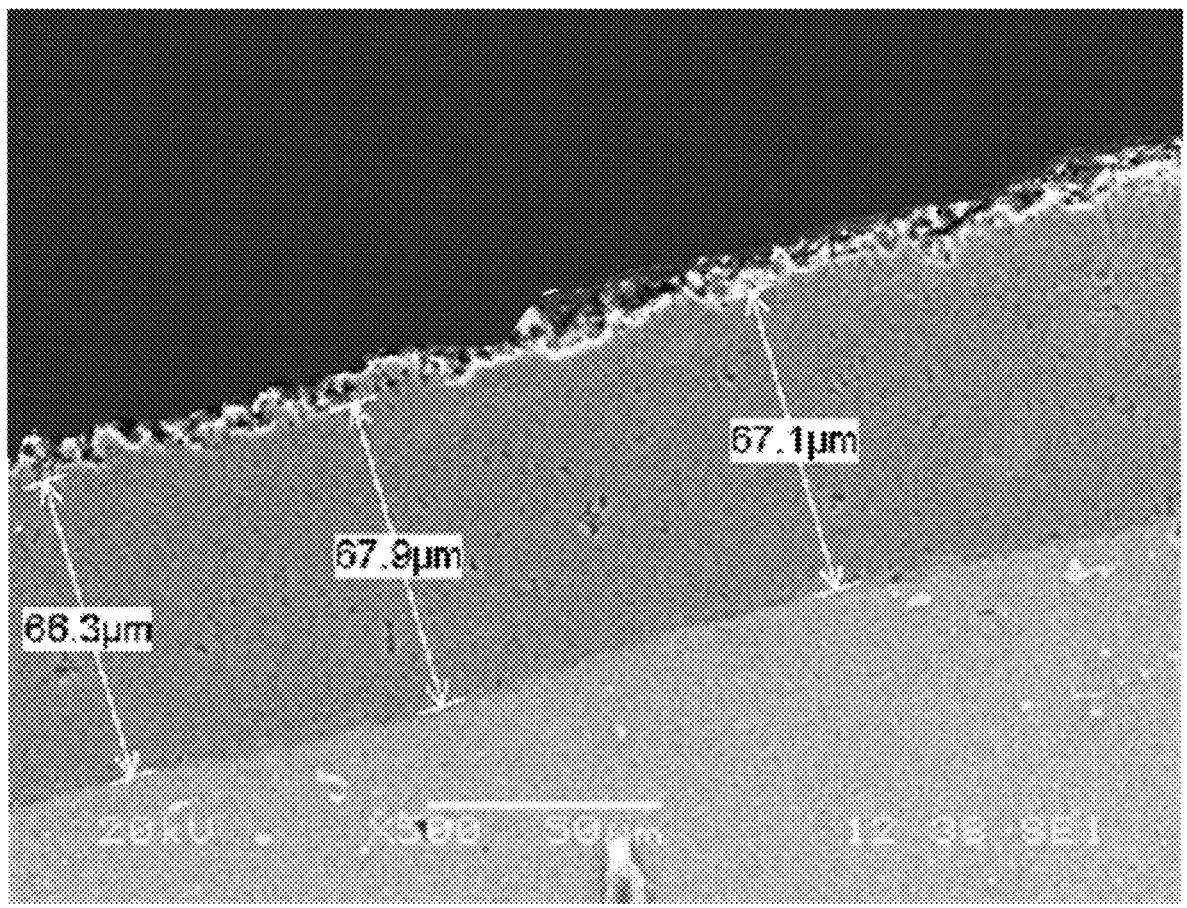
FIG. 3 is a micrograph of the GM type cryogenic refrigerator rotary valve obtained in Example 2 of Test Example 1.

Taking Example 2 as an example, the microscopic morphology of the obtained GM type cryogenic refrigerator rotary valve was observed, and the result is shown in FIG. 3.

It can be seen from FIG. 3 that the alumina ceramic membrane of the GM type cryogenic refrigerator rotary valve has a dense structure and uniform thickness, and is substantially composed of a dense layer.

Test Example 2

Taking Example 2 as an example, and Comparative Examples 1-5 are performed. The differences between Comparative Examples 1-5 and Example 2 are shown as follows: the electrolyte solution used in Comparative Example 1 does not contain sodium tungstate and sodium metaaluminate; the electrolyte solution used in Comparative Example 2 does not contain disodium EDTA and sodium citrate; the electrolyte solution used in Comparative Example 3 does not contain sodium tungstate, sodium metaaluminate, disodium EDTA and sodium citrate; the rotary valve in Comparative Example 4 is made of stainless steel, and the rotary valve in Comparative Example 5 is not plated with alumina ceramic membrane. The products obtained in Comparative Examples 1-5 and the GM type cryogenic refrigerator rotary valve are measured for average surface microhardness. The results are shown in Table 1.

TABLE 1

Performance comparison of different rotary valves

| | Example 2 | Comparative Example 1 | Comparative Example 2 | Comparative Example 3 | Comparative Example 4 | Comparative Example 5 |
|---|---|---|---|---|---|---|
| Thickness of dense oxide layer | >50 um | — | <20 um | — | — | — |
| Coverage rate of oxide layer of inner hole | >95% | <50% | <50% | <50% | — | — |
| Hardness (HV) | 1207 | — | 859 | — | 250 | 160 |

It can be seen from Table 1 that the products obtained in Comparative Examples 1-3 have thinner dense oxide layers, lower inner hole coverage rates, and significantly lower average microhardness than the GM type cryogenic refrigerator rotary valve obtained in Example 2, indicating that the electrolyte solution containing sodium tungstate, sodium metaaluminate, disodium EDTA and sodium citrate is beneficial to improve membrane coverage rate, wear resistance and sealing of a rotary valve. In addition, the electrolyte solution containing the above four substances is more effective in improving the hardness of a rotary valve than the electrolyte solution containing only sodium tungstate and sodium metaaluminate or only disodium EDTA and sodium citrate.

The GM type cryogenic refrigerator rotary valve obtained in Example 2 has average surface microhardness that is about 4.8 times higher than that of the product obtained in Comparative Example 4, indicating that use of aluminum alloy as the rotary valve material and the micro-arc oxidation process are is beneficial to improve the hardness of the GM type cryogenic refrigerator rotary valve.

The GM type cryogenic refrigerator rotary valve obtained in Example 2 has average surface microhardness that is about 7.5 times higher than that of the product obtained in Comparative Example 5, indicating that the aluminum oxide ceramic membrane plated on the aluminium alloy rotating valve can significantly improve the hardness of the GM type cryogenic refrigerator rotary valve.

In summary, the GM type cryogenic refrigerator rotary valves according to the embodiments of the present invention have advantages of small starting torque, high working face hardness, good abrasion resistance and sealing performance, long service life, etc. The preparation methods of the GM type cryogenic refrigerator rotary valves are simple, easy to operate, and can effectively prevent surfaces of the GM type cryogenic refrigerator rotary valves from being damaged by inclusion particles in gas, which results in a better sealing effect.

The above-mentioned embodiments are part, not all, of embodiments of the present invention. The detailed description of the embodiments of the present invention is not intended to limit the scope of the claimed invention, but merely represents selected embodiments of the present invention. Based on the examples in the present invention, all other examples obtained by those skilled in the art without creative work shall fall within the protection scope of the present invention.

INDUSTRIAL APPLICABILITY

The GM type cryogenic refrigerator rotary valve according to embodiments of the present invention has advantages of small starting torque, high working face hardness, high wear resistance, high sealing performance, and long service life.

The invention claimed is:

1. A GM type cryogenic refrigerator rotary valve, wherein the GM type cryogenic refrigerator rotary valve comprises an aluminum alloy rotating valve and an alumina ceramic membrane;
    the aluminum alloy rotating valve comprises a valve body, a high-pressure hole, a working boss, a low-pressure groove, a vent hole and an air chamber;
    the valve body has a first surface for arranging the working boss and a second surface opposite to the first surface; the high-pressure hole and the low-pressure groove are both arranged in the working boss, the high-pressure hole penetrates throughout the valve body along a direction from the first surface to the second surface, the vent hole is provided in the first surface and penetrates throughout the valve body along the direction from the first surface to the second surface; and the air chamber is provided on the second surface;
    the alumina ceramic membrane is plated on a surface of the aluminum alloy rotating valve.

2. The GM type cryogenic refrigerator rotary valve of claim 1, wherein a height of the working boss protruding from the first surface is in a range from 0.4 mm to 0.6 mm.

3. The GM type cryogenic refrigerator rotary valve of claim 1, wherein the alumina ceramic membrane has a thickness in a range from 60 μm to 80 μm;
    a dense layer in the alumina ceramic membrane has a thickness greater than or equal to 50 μm.

4. The GM type cryogenic refrigerator rotary valve of claim 1, wherein the GM type cryogenic refrigerator rotary valve has a surface roughness Ra≤0.1 μm for the working boss, and a surface roughness Ra≤3 μm for remaining surfaces.

5. The GM type cryogenic refrigerator rotary valve of claim 1, wherein the high-pressure hole has a cross-section in a half-moon shape.

6. The GM type cryogenic refrigerator rotary valve of claim 1, wherein the valve body includes a first cylindrical structure and a second cylindrical structure which are arranged coaxially with and connected to each other; the first cylindrical structure has a larger diameter than the second cylindrical structure; an end surface of the first cylindrical structure away from the second cylindrical structure forms the first surface, and an end surface of the second cylindrical structure away from the first cylindrical structure forms the second surface.

7. The GM type cryogenic refrigerator rotary valve of claim 6, wherein the working boss has a cylindrical outer contour, and the working boss has a smaller diameter than the first cylindrical structure and the second cylindrical structure.

8. The GM type cryogenic refrigerator rotary valve of claim 1, wherein the low-pressure groove has an elongated cross section, and both ends of the low-pressure groove are arcuate.

9. The GM type cryogenic refrigerator rotary valve of claim 1, wherein the low-pressure groove is provided in the middle of the working boss, and the high-pressure hole is provided in an edge of the working boss.

10. The GM type cryogenic refrigerator rotary valve of claim 1, wherein the vent hole is a circular hole, and the vent hole and the high-pressure hole are spaced apart.

11. The GM type cryogenic refrigerator rotary valve of claim 1, wherein the air chamber is a circular groove, and an opening of the air chamber is in a flared structure with the opening inclined outwardly.

* * * * *